(12) United States Patent
Singh et al.

(10) Patent No.: US 11,432,270 B2
(45) Date of Patent: Aug. 30, 2022

(54) SYSTEM FOR DYNAMIC PUCCH REALLOCATION

(71) Applicant: VMWARE, INC., Palo Alto, CA (US)

(72) Inventors: Sarabjot Singh, Palo Alto, CA (US); Srikanth Hariharan, Sunnyvale, CA (US); Alexandros Anemogiannis, Palo Alto, CA (US); Adnan Raja, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 229 days.

(21) Appl. No.: 16/722,086

(22) Filed: Dec. 20, 2019

(65) Prior Publication Data

US 2021/0195581 A1 Jun. 24, 2021

(51) Int. Cl.
*H04W 72/08* (2009.01)
*H04W 72/04* (2009.01)
(52) U.S. Cl.
CPC ..... *H04W 72/0413* (2013.01); *H04W 72/082* (2013.01)
(58) Field of Classification Search
CPC ........... H04W 72/0413; H04W 72/082; H04W 72/085
See application file for complete search history.

(56) References Cited

U.S. PATENT DOCUMENTS

2012/0269129 A1* 10/2012 Sawai ................... H04L 5/0005
370/328
2016/0050676 A1* 2/2016 Sinnaduray ............... H04L 5/00
370/329

\* cited by examiner

*Primary Examiner* — Brian P Cox
(74) *Attorney, Agent, or Firm* — Clayton, McKay & Bailey, PC

(57) ABSTRACT

Examples herein describe systems and methods for Physical Uplink Control Channel (PUCCH) reallocation. Interference can be detected on a Physical Resource Block (PRB) corresponding to a time-frequency unit of a resource allocated to PUCCH by a base station. The impact the interference has on a subscriber service can be quantified. The quantified services impact can be compared to a threshold. Upon determining that the service impact exceeds the threshold, PRBs of other resources on the base station can be analyzed. The analysis can predict how reallocating the other resources to PUCCH can improve the quality of the subscriber service. One of the other resources can be selected, and instructions can be provided to reallocate the selected resource to PUCCH.

20 Claims, 6 Drawing Sheets

SYSTEM FOR DYNAMIC PUCCH REALLOCATION

BACKGROUND

Mobile telecommunication networks connect user devices to a core network through wireless transceivers generally referred to as base stations. The mobile networks implement channel allocation schemes to effectively manage data transfer. These schemes divide a base station's bandwidth into equally spaced frequency bands. These frequency bands are allocated to specific channels for data exchange where each channel is responsible for exchanging a different kind of information. The Physical Uplink Control Channel ("PUCCH") is an important physical channel in the uplink direction that carries Uplink Control Information ("UCI"). The UCI carried by PUCCH includes scheduling requests, hybrid automatic repeat request acknowledgements ("HARQ-ACKs"), and Channel State Information ("CSI").

PUCCH is typically allocated to frequency bands toward the extreme ends of the system bandwidth. For example, in many mobile networks using Long Term Evolution ("LTE") communication standards, PUCCH is divided into two locations, one on or near each end of the system bandwidth, and PUCCH transmissions repeatedly alternate between the two locations. For example, in many LTE networks the PUCCH transmissions alternate every subframe, or 1 millisecond.

One problem with this allocation method is that the edge bandwidth locations where PUCCH is typically allocated are subject to greater signal interference. Interference in licensed wireless spectrum, owned by commercial telecom service providers, leads to significant performance degradation of the services offered. In particular, interference on a PUCCH can lead to degradation of the PUCCH signal to interference ratio ("SINR"), which can result in a decoding failure. Failure to decode the important UCI information carried on a PUCCH can negatively affect subscriber services, like throughput in both the uplink and the downlink, voice over Long-Term Evolution ("VoLTE") speech quality, user accessibility and retainability.

As a result, a need exists for dynamically detecting interference on PUCCH and reallocating resources to PUCCH to mitigate service degradation.

SUMMARY

Examples described herein include systems and methods for PUCCH reallocation. The systems and methods presented herein relate to detecting interference on base station resources allocated to PUCCH, predicting improvements of reallocating other resources to PUCCH, and providing instructions to the base station to reallocate resources to PUCCH.

An example method can include detecting interference on a PUCCH of a base station. Detecting interference can include receiving interference data reported by the base station. The inference data can include, as an example, signal quality information, including interference levels reported on Physical Resource Blocks ("PRBs") corresponding to PUCCH frequency bands. A PRB is the smallest time-frequency unit that can be allocated to a user device for data transmission. As an example, in a mobile network using LTE communication standards, a PRB is often a band of 12 contiguous subcarrier frequencies (a frequency band size) over one time slot (0.5 ms). PRBs corresponding to PUCCH frequency bands are the time-frequency allocated units that fall within the designated frequency bands of PUCCH.

Another example of detecting interference can include receiving and processing telemetry and allocation data to measure interference on PRBs allocated to PUCCH.

The method can include determining the impact of interference on a subscriber service. Some examples of a subscriber service include downlink/uplink ("DL/UL") throughput, VoLTE quality, and call drop rate. Determining the interference impact can include quantifying the impact by assigning numerical values to the subscriber service, creating a data set from the telemetry data and assigned subscriber service values, and performing a regression analysis on the data set.

The method can also include determining that the quantified interference impact exceeds a threshold. In an example, the quantified service impact can be compared to a threshold set by an administrator or the network service provider.

Based on the determination, the method can include analyzing PRBs of other frequency bands broadcast by the base station to predict how the quality of the subscriber service can improve if those frequency bands were reallocated to PUCCH. This can include quantifying the predicted improvement and comparing it to the PUCCH interference impact. For example, signal quality information for frequency bands not allocated to PUCCH can be analyzed to determine how much the subscriber services may improve if one or more of those frequency bands were reallocated PUCCH.

The method can further include selecting the best available frequency band for PUCCH allocation based on the predictions. The best available frequency band can be the frequency band with interference levels that would least affect the subscriber service, in one example. In some examples, the network service provider may blacklist certain frequency bands from PUCCH reallocation. For example, the network service provider may prioritize another channel type over PUCCH, and reallocating frequency bands of that channel type to PUCCH can cause greater service degradation. Based on the prediction and selection, the method can include sending instructions to the base station to reallocate the selected frequency band to PUCCH.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described. The telemetry data can include signal quality information.

Both the foregoing general description and the following detailed description are exemplary and explanatory only and are not restrictive of the examples, as claimed. Although references are made herein to LTE mobile networks and standards, those references are merely used as examples and are not intended to be limiting in any way. For example, LTE networks can encompass any mobile networks that utilize PUCCH, such as 5G networks.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples herein describe systems and methods for PUCCH reallocation. A computing device can receive interference information relating to frequency bands of a base station allocated PUCCH. The computing device can quantify the impact the interference has on a subscriber service and compare the quantified service impact to a threshold. Upon determining that the service impact exceeds the threshold, the computing device can analyze other frequency bands broadcast by the base station and predict how reallocating the other frequency bands to PUCCH can improve the quality of the subscriber service. The computing device can select one of the other frequency bands and provide instructions to the base station to reallocate the selected frequency band to PUCCH.

Figure 1:
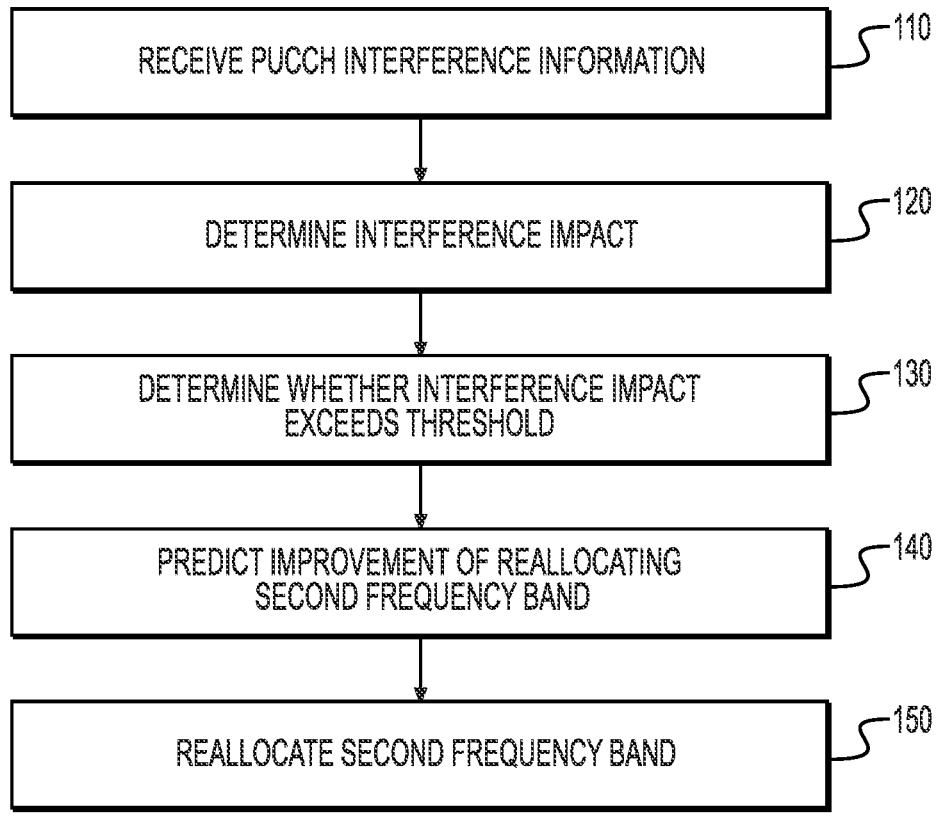
FIG. 1 is a flowchart of an example method for dynamic PUCCH reallocation.

FIG. 1 is a flowchart of an example method for dynamic PUCCH reallocation. At stage 110, a computing device can receive interference information relating to frequency bands of a base station allocated to PUCCH. The computing device can be, as an example, a server, such as a network server, that can communicate with a base station or another device in the network of the base station ("network device"). The server can be a single server or a group of servers, including multiple servers implemented virtually across multiple computing platforms. Although references are made to a "computing device" throughout, the computing device can comprise multiple devices, including virtual or cloud-based devices. In some examples, the computing device can be a component of a base station or network device.

Receiving interference information relating to a PUCCH allocated frequency band can include receiving interference data from a base station or network device. Examples of interference information can include information related to signal quality, telemetry, and base station allocation information. Allocation information include data channel allocation of base station frequencies, including PUCCH. Receiving interference information from a base station or network device can include the computing device requesting the interference data. This can be done, for example, using a database query or an application programming interface ("API") call to the base station or network device, and the base station or network device can respond with one or more data files in response to the request. In one example, the computing device can be from a third-party vendor with authorized access to devices in the network. The data files can be XML or JSON files, for example.

Receiving interference information can also include measuring signal interference on PRBs corresponding to PUCCH frequencies. In one example, the computing device can analyze telemetry data to determine PRB interference levels and check the telemetry data against allocation data to determine interference levels of PRBs allocated to PUCCH.

In another example, the interference data received by the computing device can include interference levels. For example, a network device can receive and analyze telemetry data from a base station to determine interference levels, and the computing device can receive the interference levels from the network device.

At stage 120, the computing device can determine the impact of the interference on a subscriber service. Some examples of subscriber services include DL/UL throughput, VoLTE quality, and call drop rate. The interference impact can be quantified on one or multiple subscriber services. Determining the service impact can include quantifying the service impact using numerical measurements associated with service failures to determine a service impact score.

For example, packet loss rate can be used to quantify the DL/UL throughput and VoLTE interruption, and a percentage or number of dropped calls over time can be used for call drop rate. In an example, the computing device can use algorithms and statistical modeling to determine service impact scores. The algorithms and models used can vary according to the service provider that manages the base station. For example, the algorithms and models can account for one, multiple, or all subscriber services offered. They can also prioritize services by weighing the services differently from each other. For example, a multiplier can be added to each service based on priority. In some examples, the algorithms and models can determine a service impact score for each service. In other examples, the algorithms and models can determine a single service impact score that accounts for some or all subscriber services.

In an example, the computing device uses DL throughput, UL throughput, VoLTE interruption, and call drop rate to determine service impact. The computing device can weigh the services using multipliers: DL throughput is 1.5×, UL throughput is 0.75×, VoLTE interruption is 1×, and call drop rate is 1.25×. In this example, interference data from a base station indicates that PUCCH signal interference is causing a DL throughput packet loss rate of 50%, a UL throughput packet loss rate of 40%, a VoLTE packet loss rate of 45%, and a call drop rate of 20%. In this example, the computing device applies the multiplier of each service to the percentage number from signal interference, resulting in the following impact scores: DL throughput=1.5×50=75, UL throughput=0.75×40=30, VoLTE=1×45=45, and call drop rate=1.25×20=25. The table below summarizes the impact scores:

| Service | Multiplier | Interference | Impact Score |
|---|---|---|---|
| DL throughput | 1.5 | 50% | 75 |
| UL throughput | .75 | 40% | 30 |
| VoLTE | 1 | 45% | 45 |
| Call drop rate | 1.25 | 20% | 25 |
| Total | | | 175 |

At stage 130, the computing device can determine that the service impact of the interference exceeds a threshold. The threshold can be set by an administrator, for example, and can relate to an individual service, a group of services, or all services. In one example, the computing device can determine a single service impact score and compare the service impact score to a single predetermined threshold value. In another example, the computing device can determine individual service impact scores for multiple subscriber services. The computing devices can compare each individual service impact score to predetermined threshold values assigned to each service. The service impact of the interference can exceed the threshold if the service impact score of one service exceeds its associated threshold value. In another example, the service impact of the interference can exceed the threshold if all the individual service impact scores exceed their associated threshold values.

Continuing the previous example with calculated impact scores, the computing device compares the summed impact score total (175) to a predetermined threshold of 150. Because 175 is greater than 150, the impact score exceeds the threshold. In another example, the computing device compares each individual impact score to a single service threshold of 50. Although the impact scores of UL throughput, VoLTE, and call drop rate are below 50, because the DL throughput impact score (75) is greater than 50, the impact score exceeds the threshold.

At stage 140, the computing device can predict the improvement that can be obtained by reallocating a second frequency band to PUCCH. A second frequency band can be one, a set of, or all available frequency bands broadcast by the base station. The improvement prediction can include analyzing historical telemetry or interference data related to the PRBs of the second frequency band to determine what the service impact would be if the second frequency band were allocated to PUCCH.

As an example, the computing device can analyze PRBs related to the second frequency band corresponding to the same time frame as the PUCCH PRBs from stage 110. The computing device can analyze this historical data in a similar manner to stage 120 to quantify what the service impact would have been if the second frequency band were allocated to PUCCH. This can then be used to predict the service impact improvement upon reallocating the second resource to PUCCH. In an example, the computing device can measure the service impact improvement by determining a predicted service impact score for the second resource and comparing it to the service impact score of the PUCCH resource. In some examples, the computing device can predict and compare the service improvement of multiple frequency bands and determine which frequency band would provide the greatest service improvement if reallocated to PUCCH.

At stage 150, the computing device can provide instructions to the base station to reallocate the second frequency band to PUCCH. In one example, the computing device can transmit the instructions to a network device, which can relay the instruction to the base station. For example, many wireless service providers use Self-Organizing Networks ("SON") that automate planning, configuration, management, and optimization of mobile radio networks such as LTE systems. In a Centralized SON ("C-SON"), these functions are managed by higher level nodes in the base station network or a network operations center. C-SON systems typically involve some degree of human intervention. In a C-SON system, the computing device can provide the frequency reallocation instructions to the network device that manages the SON functions of the base station. This can be done using, for example, an API call to the network device. The instructions can also be provided using any other type of messaging service or through a dedicated interface with the network device.

In another example, the base station can be directly accessible to the computing device. For example, a Distributed SON ("D-SON") is a type of SON with a flat architecture where the SON functions are distributed among base stations without a higher-level centralized device involved. The base stations communicate with each other on a closed loop, which allows them to rapidly and dynamically optimize the network. In a D-SON system, the computing device can provide the frequency reallocation instructions directly to the base station. For example, the computing device can make an API call to the SON application on the base station. The base station can then update its frequency allocation parameters, broadcast the parameter changes to user devices connected to it using, for example, a System Information Block ("SIB"), and, if needed, can communicate the parameter changes to other base stations on the D-SON. SIBs carry important messages sent to user devices from a base station that include parameters necessary for communicating with the base station and the network.

Figure 2:
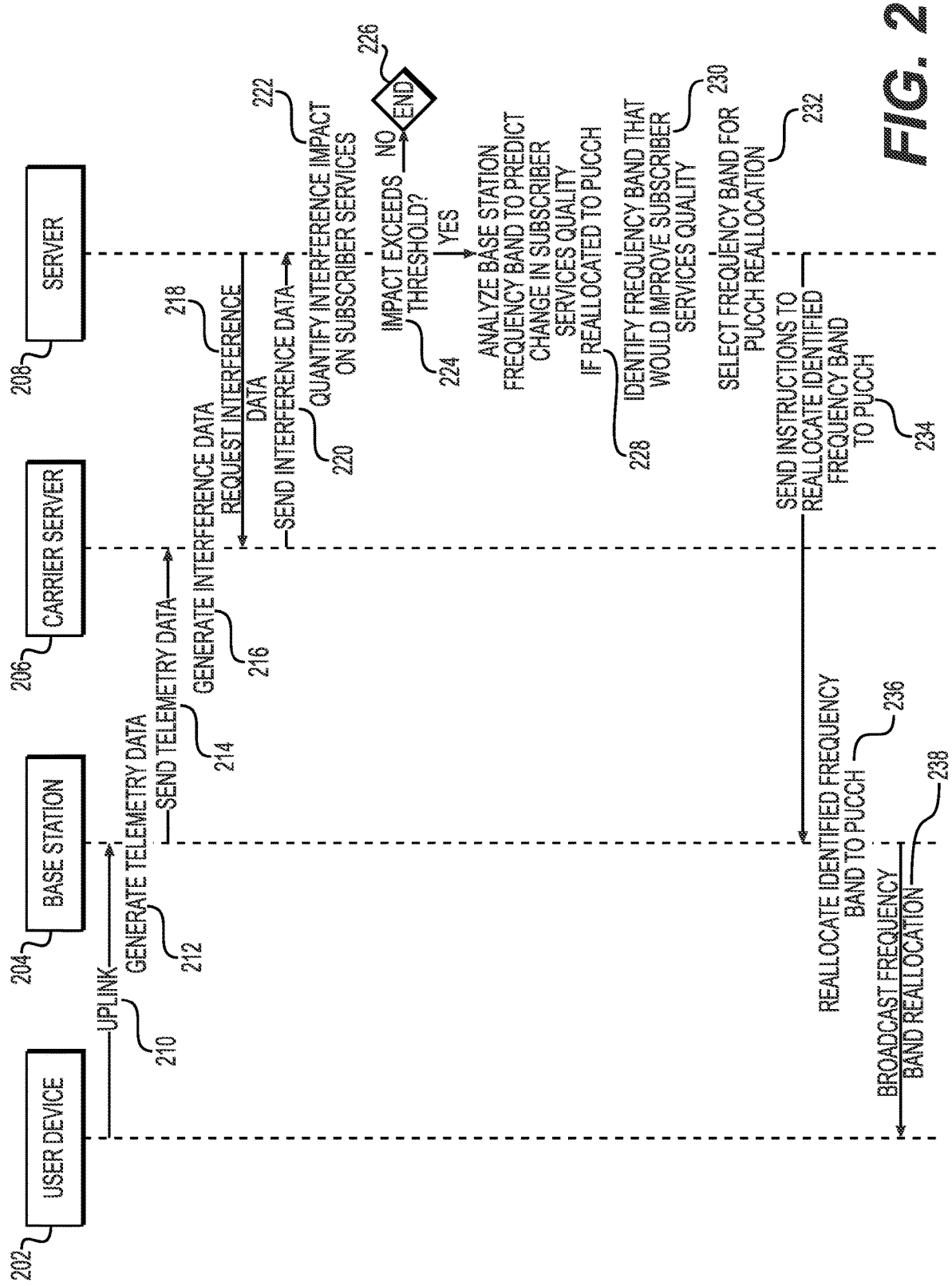
FIG. 2 is a sequence diagram of an example method for dynamic PUCCH reallocation.

FIG. 2 is an example sequence diagram for dynamic PUCCH reallocation in a system that includes user device 202, base station 204, network device 206, and server 208. User device 202 can be one or more processor-based devices, such as a personal computer, tablet, or cell phone, with the capability to connect to a wireless network. Base station 204 can be a radio transceiver that can connect user devices wirelessly to a telecommunications network. Network device 206 can be, for example, a high-level node, server, or any other type of computing device in the same network as base station 204. Server 208 can be a network server, such as those previously described.

At stage 210, user device 202 can transmit data wirelessly to base station 204. The data can include CSI information transmitted on a PUCCH allocated resource. At stage 212, base station 204 can generate telemetry data related to the data transmission. The telemetry data can include signal quality information, as an example. At stage 214, base station 204 can transmit the telemetry data to network device 206. In one example, network device 206 makes a request to base station 204 for the telemetry data. In another example, network device 206 and base station 204 have an open communication channel in which base station 204 regularly transmits telemetry data to network device 206. At stage 216, network device 206 can generate interference data using the telemetry data. The interference data can include, for example, PRB signal interference measurements, subscriber services quality data, and allocation data from base station 204. In an example, generating interference data includes analyzing the telemetry data to determine PRB interference levels and service interruption levels. Examples of service interruption levels can include pack loss rate and call drop rate. At stage 218, server 208 can request the interference data from network device 206, and, at stage 220, network device 206 can respond by transmitting the interference data to server 208. This can be done, for example, using a database query or API call to the network device and the network device can respond with one or more data files in response to the request.

At stage 222, server 208 can quantify the impact the signal interference of PUCCH PRBs on subscriber services. In an example, server 208 can quantify the service impact using the method described in stage 120 of FIG. 1. For example, server 208 can apply interference measurements to algorithms and statistical models to determine a service impact score. The algorithms and models used can vary according to the service provider that manages the base station. For example, server 208 can account for one, multiple, or all subscriber services offered. Server 208 can also prioritize services by weighing the services differently from each other, such as adding a multiplier to each service based on priority. In some examples, server 208 can determine a service impact score for each service. In other examples, server 208 can determine a single service impact score that accounts for some or all subscriber services.

At stage 224, server 208 can compare the service impact to a predetermined threshold. For example, server 208 can compare a calculated impact score to a predetermined impact score threshold set by the service provider. In one example, server 208 can determine a single service impact score that accounts for all services and compare the service impact score to a single predetermined threshold value. In another example, server 208 can determine individual service impact scores for multiple services. Server 208 can compare each individual service impact score to predetermined threshold values assigned to each service by the service provider. The service impact of the interference exceeds the threshold if the service impact score of one service exceeds its associated threshold value. In another example, the service impact of the interference exceeds the threshold if all the individual service impact scores exceed their associated threshold values. If the service impact does not exceed the threshold, then at stage 226 the process ends because no reallocation is necessary.

If the service impact does exceed the threshold, then, at stage 228, server 208 can analyze frequencies of non-PUCCH allocated PRBs of base station 204. This analysis can include predicting how reallocating the frequencies to PUCCH would improve, or worsen, the quality of subscriber services. As an example, the prediction analysis can be done using the method described in stage 140 of FIG. 1. For example, server 208 can analyze PRBs of non-PUCCH frequencies corresponding to the same time frame as the PUCCH PRBs experiencing interference. Server 208 can analyze this historical data in a similar manner to stage 222 to quantify what the service impact would have been if the non-PUCCH frequencies were allocated to PUCCH. This can then be used to predict the service impact improvement upon reallocating those frequencies to PUCCH. In an example, server 208 can measure the service impact improvement by determining a predicted service impact score for the non-PUCCH frequencies and comparing it to the service impact score of the PUCCH frequencies. In some examples, the computing device can predict and compare the service improvement of multiple frequencies and determine which frequency band would provide the greatest service improvement if reallocated to PUCCH.

At stage 230, server 208 can identify one or more frequency bands that would improve the quality of subscriber services if reallocated to PUCCH. At stage 232, server 208 can select a frequency band from those identified to reallocate to PUCCH. For example, server 208 can compare the identified frequency bands and select the frequency band that would provide the greatest improvement to subscriber services.

At stage 234, server 208 can transmit instructions to base station 204 for reallocating the selected frequency band to PUCCH. In an example, server 208 can send the instructions by making an API call to base station 204. In another example, server 208 can send the instructions to network device 206, and network device 206 can transmit the instructions to base station 204. At stage 236, base station 204 can reallocate the selected frequency band to PUCCH. This can also include reallocating the frequency bands already allocated to PUCCH to another channel type. In some examples, base station 204 can cease broadcasting any signals on the frequency band previously allocated to PUCCH on account of the interference. At stage 238, base station 204 can broadcast the frequency band allocation change to user device 202. For example, base station 204 can broadcast the frequency band allocation on a SIB. In an example, base station 202 can also transmit the PUCCH reallocation information to other nearby base stations to allow for smooth handover of user devices between the base stations.

Figure 3:
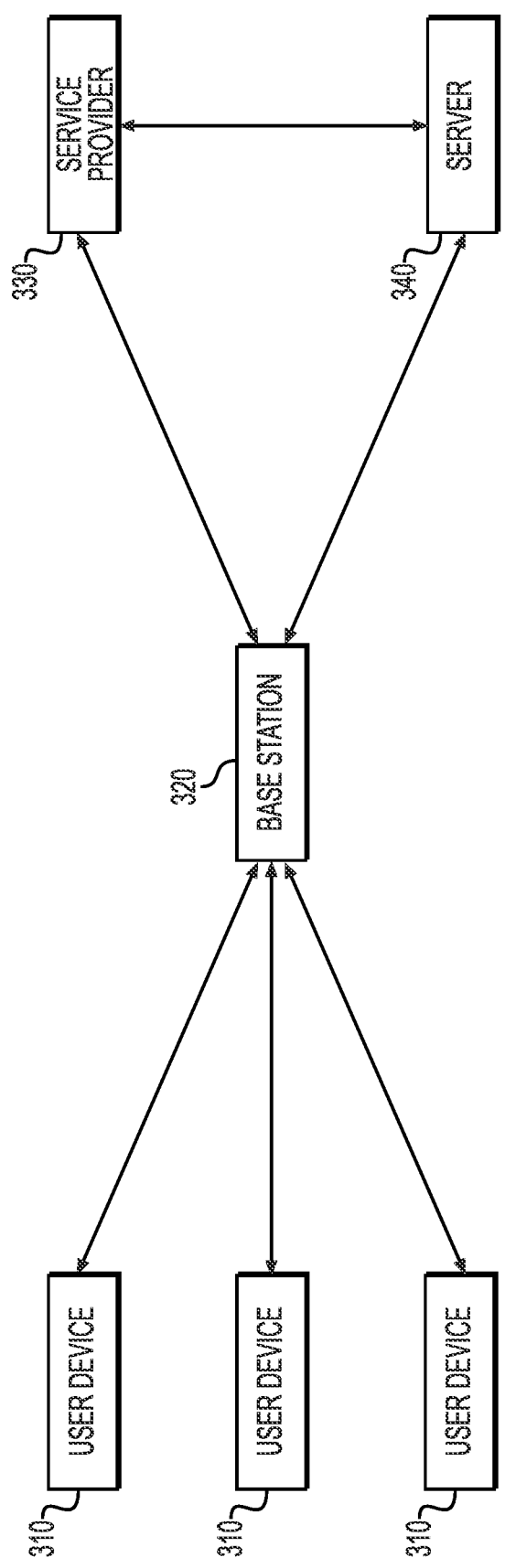
FIG. 3 is an illustration of an example system for performing dynamic PUCCH reallocation.

FIG. 3 illustrates a system 300 for performing dynamic PUCCH reallocation as described in FIG. 2, for example. System 300 can include user devices 310, base stations 320, service provider network device 330, and server 340. User device 310 can be one or more processor-based devices, such as a personal computer, tablet, or cell phone, with the capability to connect to a wireless network. Base station 320 can be a radio receiver/transmitter that can connect user devices 310 wirelessly to a telecommunications network. For example, base station 320 can be an eNodeB that is part of an LTE telecommunications system. Network device 330 can be a server or network device, such as a high-level node or server, that is in the same network as base station 320. Server 340 can be a network server, such as those previously described. Network device 330 and server 340 can be communicatively connected to each other as well as base station 320.

Base station 320 can include API 322. In an example, API 322 can be a SON API that allows multiple base stations 320 to communicate with each other to plan, configure, manage, and optimize the network. Server 340 can be configured to interact with SON API 322 to update parameters on base station 320. In one example, using methods described in FIG. 2, server 340 can receive interference data on multiple base stations 320 from network device 330. Server 340 can then send PUCCH reallocation parameters to the base stations 320 experiencing above threshold service impact interference.

Figure 4:
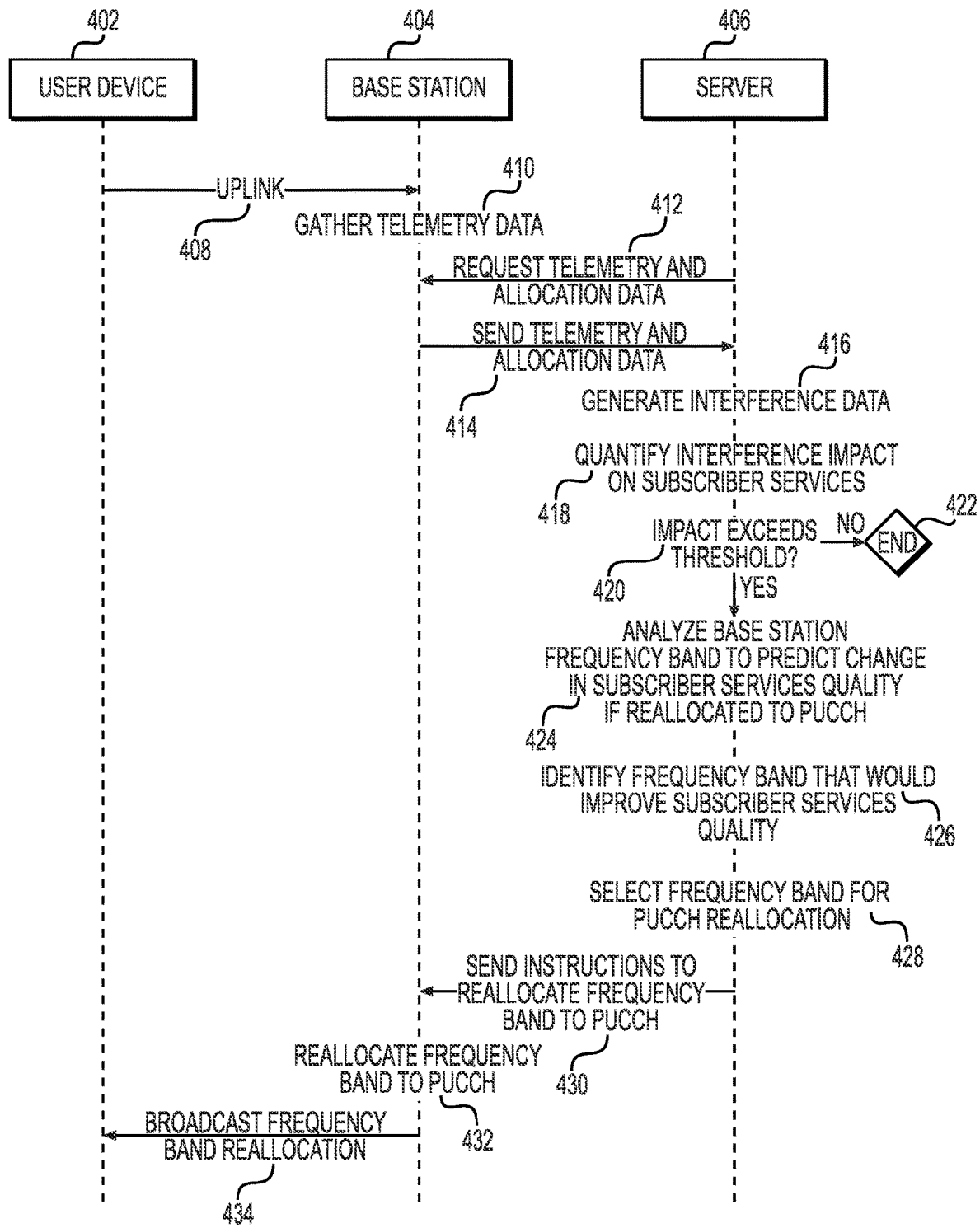
FIG. 4 is another sequence diagram of an example method for dynamic PUCCH reallocation.

FIG. 4 is an example sequence diagram for dynamic PUCCH reallocation in a system 400 that includes user device 402, base station 404, and server 406. User device 402 can be one or more processor-based devices, such as a personal computer, tablet, or cell phone, with the capability to connect to a wireless network. Base station 404 can be a radio transceiver that can connect user devices wirelessly to a telecommunications network. Server 406 can be a network server, such as those previously described.

At stage 408, user device 402 can transmit data wirelessly to base station 404. The data can include CSI information transmitted on a PUCCH allocated frequency band. At stage 410, base station 404 can generate telemetry data related to the data transmission. The telemetry data can include signal quality information, as an example. At stage 412, server 406 can request telemetry and allocation data from base station 404, and at stage 414 base station 404 can transmit the requested telemetry and allocation data to server 406. At stage 416, server 406 can generate interference data using the telemetry data. The interference data can include, for example, PRB signal interference measurements, subscriber services quality data, and allocation data from base station 404. In an example, generating interference data includes analyzing the telemetry data to determine PRB interference levels and service interruption levels. Examples of service interruption levels can include packet loss rate and call drop rate.

At stage 418, server 406 can quantify the impact the signal interference of PUCCH PRBs has on subscriber services. In an example, server 406 can quantify the service impact using the method described in stage 120 of FIG. 1. For example, server 406 can apply interference measurements to algorithms and statistical models to determine a service impact score. The algorithms and models used can vary according to the service provider that manages the base station. For example, server 406 can account for one, multiple, or all subscriber services offered. Server 406 can also prioritize services by weighing the services differently from each other, such as adding a multiplier to each service based on priority. In some examples, server 406 can determine a service impact score for each service. In other examples, server 406 can determine a single service impact score that accounts for some or all subscriber services.

At stage 420, server 406 can compare the service impact to a predetermined threshold. For example, server 406 can compare a calculated impact score to a predetermined impact score threshold set by the service provider. In one example, server 406 can determine a single service impact score that account for all services and compare the service impact score to a single predetermined threshold value. In another example, server 406 can determine individual service impact scores for multiple services. Server 406 can compare each individual service impact score to predetermined threshold values assigned to each service by the service provider. The service impact of the interference can exceed the threshold if the service impact score of one service exceeds its associated threshold value. In another example, the service impact of the interference can exceed the threshold if all the individual service impact scores exceed their associated threshold values.

If the service impact does not exceed the threshold, then at stage 422 the process ends because no reallocation is necessary. If the service impact does exceed the threshold, then, at stage 424, server 406 can analyze PRBs of non-PUCCH allocated frequency bands. This analysis can include predicting how reallocating the frequency bands to PUCCH would improve, or worsen, the quality of subscriber services. As an example, the prediction analysis can be done using the method described in stage 140 of FIG. 1. For example, server 406 can analyze PRBs of non-PUCCH frequencies corresponding to the same time frame as the PUCCH PRBs experiencing interference. Server 406 can analyze this historical data in a similar manner to stage 418 to quantify what the service impact would have been if the non-PUCCH frequencies were allocated to PUCCH. This can then be used to predict the service impact improvement upon reallocating those frequencies to PUCCH. In an example, server 406 can measure the service impact improvement by determining a predicted service impact score for the non-PUCCH frequencies and comparing it to the service impact score of the PUCCH frequencies. In some examples, the computing device can predict and compare the service improvement of multiple frequencies and determine which frequency band would provide the greatest service improvement if reallocated to PUCCH.

At stage 426, server 406 can identify frequency bands that would improve the quality of subscriber services if reallocated to PUCCH. At stage 428, server 406 can select frequency bands from those identified to reallocate to PUCCH. For example, server 406 can compare the identified frequency bands and select the frequency band that would provide the greatest improvement to subscriber services.

At stage 430, server 406 can transmit instructions to base station 404 for reallocating the selected frequency band to PUCCH. In an example, server 406 can send the instructions by making an API call to base station 404. At stage 432, base station 404 can reallocate the selected frequency bands to PUCCH. This can also include reallocating the frequency bands already allocated to PUCCH to another channel type. In some examples, base station 404 can cease broadcasting any signals on the frequency band previously allocated to PUCCH on account of the interference. At stage 434, base station 404 can broadcast the frequency band reallocation change to user device 402. For example, base station 404 can broadcast the frequency band reallocation on a SIB. In an example, base station 402 also transmits the PUCCH reallocation information to other nearby base stations to allow for smooth handover of user devices between the base stations.

Figure 5:
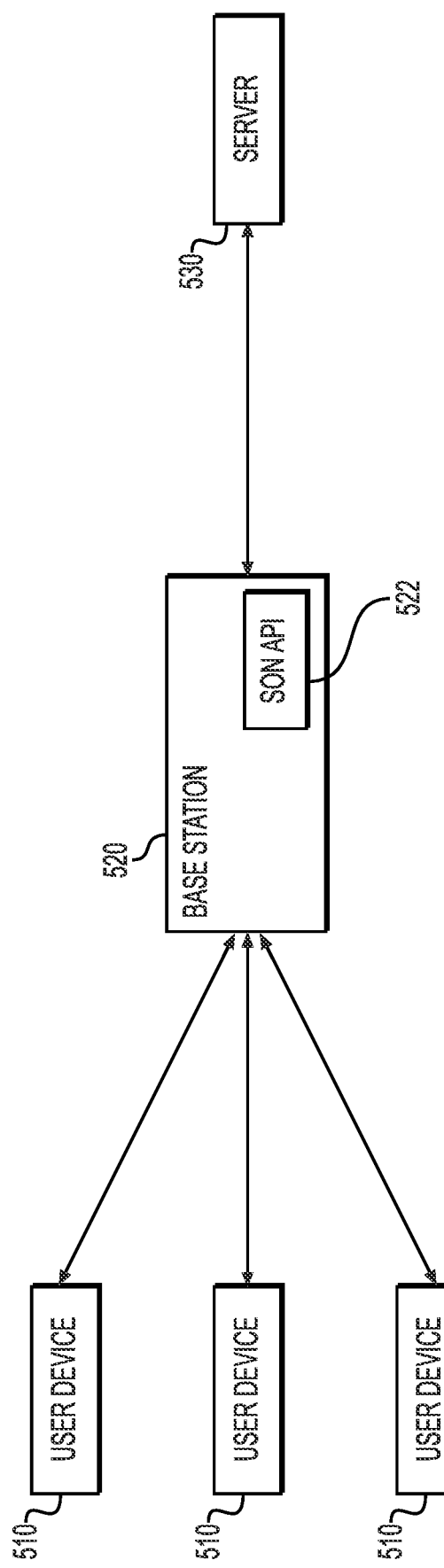
FIG. 5 is an illustration of another example system for performing dynamic PUCCH reallocation.

FIG. 5 illustrates a system 500 for performing dynamic PUCCH reallocation as described in FIG. 4. System 500 can include user devices 510, base station 520, and server 530. User device 510 can be one or more processor-based devices, such as a personal computer, tablet, or cell phone, with the capability to connect to a wireless network. Base station 520 can be one or more radio receiver/transmitters with the capability to connect user devices wirelessly to a telecommunications network. For example, base station 520 can be an eNodeB that is part of an LTE telecommunications system. Server 530 can be a network server, such as those previously described. Server 530 can be communicatively connected to base station 520.

Base station 520 can include API 522. In an example, API 522 can be a SON API that allows multiple base stations 520 to communicate with each other to plan, configure, manage, and optimize the network. Server 530 can be configured to interact with SON API 522 to exchange data and update parameters on base station 520. In one example, using methods described in FIG. 4, server 530 can receive telemetry and allocation data from multiple base stations 520 and provide PUCCH reallocation parameters to the base stations 520 experiencing above threshold service impact interference.

Figure 6:
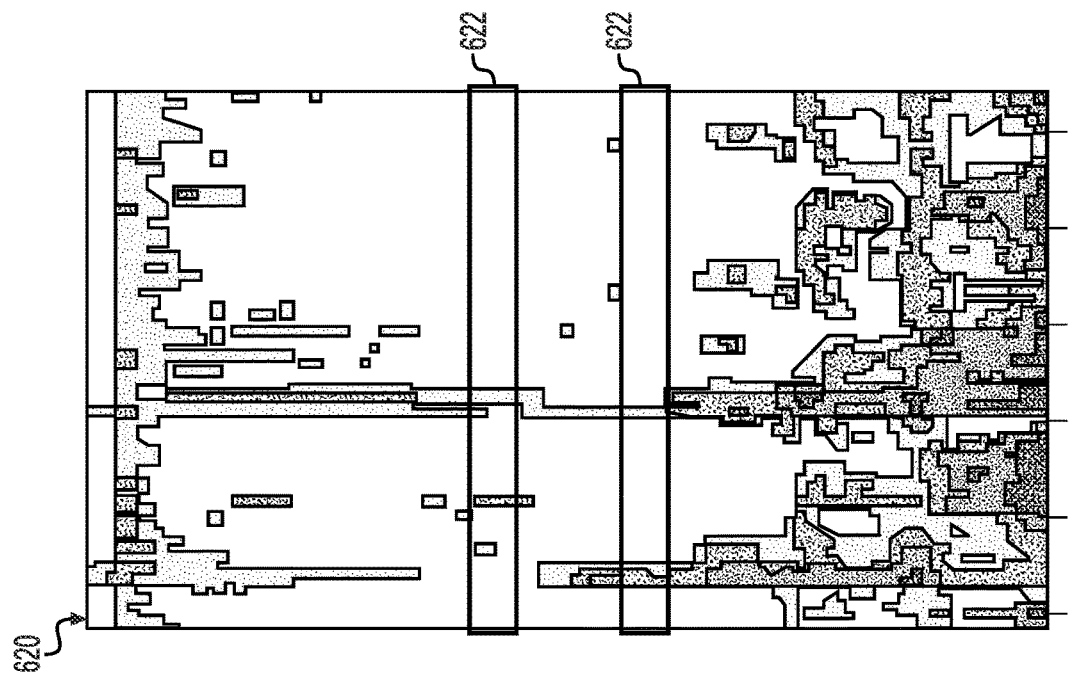
FIG. 6 is an illustration of measured PRB interference and PUCCH reallocation.
Figure 6:
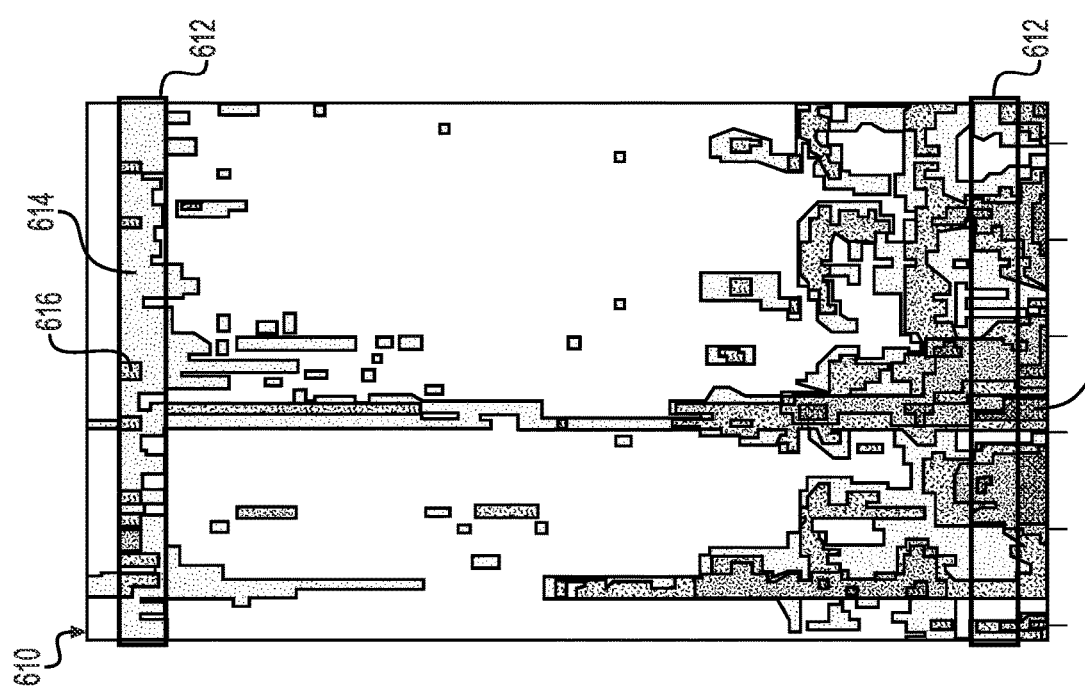

FIG. 6 is a visual depiction of telemetry data illustrating signal interference and PUCCH reallocation on a base station. Graphs 610 and 620 are time-frequency graphs where the y-axis represents frequencies, and the x-axis represents time. In an example mobile network, the frequencies along the y-axis can be divided into frequency bands the width of one PRB. For example, many LTE networks allocate twelve 15 kHz subcarriers for each PRB, making the frequency band of the PRB 180 kHz wide. Each PRB frequency band per time slot (0.5 ms) represents a single PRB. Accordingly, PUCCH regions 612 and 622 represent PRBs allocated to PUCCH. The y-axis portions of graph 610 inside PUCCH region 612 represent frequency bands allocated to PUCCH prior to reallocation, and the y-axis portions of graph 620 inside PUCCH region 622 represent frequency bands allocated to PUCCH after reallocation. Interference regions 614, 616, and 618 illustrate reported interference on the PRBs. The darker shaded regions illustrate greater interference level. For example, PRBs in interference region 616 reported greater interference than interference region 614, and PRBs in interference region 618 reported greater interference than interference region 616.

Using FIG. 4 as an example, graph 610 represents the telemetry and allocation data transmitted from base station 404 to server 406 at stage 414. Graph 610 represents the telemetry data and the y-axis of graph 610 represents the allocation data. Interference regions 614, 616, and 618 illustrate the interference data measured at stage 416. The portions of graph 610 outside of PUCCH region 612 represent the resources and data analyzed at stage 424 to predict possible service improvement. PUCCH region 622 represents the set of resources selected for PUCCH reallocation at stage 426.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for Physical Uplink Control Channel ("PUCCH") reallocation, comprising:
    receiving interference information corresponding to a first frequency band allocated to the PUCCH by a base station;
    determining an impact of interference on a subscriber service;
    determining that the impact exceeds an impact threshold;
    predicting an improvement in the subscriber service based on reallocating the PUCCH from the first frequency band to a second frequency band; and
    based on the predicted improvement exceeding an improvement threshold, providing instructions to the base station to reallocate the PUCCH from the first frequency band to the second frequency band.

2. The method of claim 1, wherein the interference information comprises signal quality information relating to a plurality of Physical Resource Blocks (PRBs), including PRBs corresponding to the first and second frequency bands.

3. The method of claim 1, wherein determining the impact on the subscriber service further comprises:
    assigning quantitative values to the subscriber service; and
    creating a data set from signal quality information received from the base station and corresponding assigned quantitative values of the subscriber service.

4. The method of claim 1, wherein the subscriber service comprises at least one of: download throughput, upload throughput, voice over Long-Term Evolution ("VoLTE") quality, and call drop rate.

5. The method of claim 1, wherein predicting the improvement in the subscriber service based on reallocating the PUCCH from the first frequency band to the second frequency band further comprises:
    analyzing signal quality information of a plurality of PRBs corresponding to a plurality of frequency bands not allocated to PUCCH, the plurality of frequency bands including the second frequency band; and
    for each of the plurality of frequency bands, predicting an impact of the interference on the subscriber service if the respective frequency band was reallocated to PUCCH.

6. The method of claim 1, further comprising selecting the second frequency band from the plurality of frequency bands based on the second frequency band having a lowest predicted impact on the subscriber service.

7. The method of claim 1, further comprising:
    receiving additional interference information, wherein the additional interference information corresponds to a time period after the interference information; and
    determining an impact of the additional interference on the subscriber service.

8. A non-transitory, computer-readable medium containing instructions that, when executed by a hardware-based processor, performs stages for a Physical Uplink Control Channel ("PUCCH") reallocation, the stages comprising:
    receiving interference information corresponding to a first frequency band allocated to the PUCCH by a base station;
    determining an impact of interference on a subscriber service;
    determining that the impact exceeds an impact threshold;
    predicting an improvement in the subscriber service based on reallocating the PUCCH from the first frequency band to a second frequency band; and
    based on the predicted improvement exceeding an improvement threshold, providing instructions to the base station to reallocate the PUCCH from the first frequency band to the second frequency band.

9. The non-transitory, computer-readable medium of claim 8, wherein the interference information comprises signal quality information relating to a plurality of PRBs, including PRBs corresponding to the first and second frequency bands.

10. The non-transitory, computer-readable medium of claim 8, wherein determining the impact on the subscriber service further comprises:
    assigning quantitative values to the subscriber service; and
    creating a data set from signal quality information received from the base station and corresponding assigned quantitative values of the subscriber service.

11. The non-transitory, computer-readable medium of claim 8, wherein the subscriber service comprises at least one of: download throughput, upload throughput, voice over Long-Term Evolution ("VoLTE") quality, and call drop rate.

12. The non-transitory, computer-readable medium of claim 8, wherein predicting the improvement in the subscriber service based on reallocating the PUCCH from the first PRB to the second PRB further comprises:
    analyzing signal quality information of a plurality of PRBs corresponding to a plurality of frequency bands not allocated to PUCCH, the plurality of frequency bands including the second frequency band; and
    for each of the plurality of frequency bands, predicting an impact of the interference on the subscriber service if the respective frequency band was reallocated to PUCCH.

13. The non-transitory, computer-readable medium of claim 8, selecting the second frequency band from the plurality of frequency bands based on the second frequency band having a lowest predicted impact on the subscriber service.

14. The non-transitory, computer-readable medium of claim 8, further comprising:
    receiving additional interference information, wherein the additional interference information corresponds to a time period after the interference information; and
    determining an impact of the additional interference on the subscriber service.

15. A system for a Physical Uplink Control Channel ("PUCCH") reallocation, comprising:
    a memory storage including a non-transitory, computer-readable medium comprising instructions; and
    a computing device including a hardware-based processor that executes the instructions to carry out stages comprising:
        receiving interference information corresponding to a first frequency band allocated to the PUCCH by a base station;

determining an impact of interference on a subscriber service;

determining that the impact exceeds an impact threshold;

predicting an improvement in the subscriber service based on reallocating the PUCCH from the first frequency band to a second frequency band; and based on the predicted improvement exceeding an improvement threshold, providing instructions to the base station to reallocate the PUCCH from the first frequency band to the second frequency band.

16. The system of claim 15, wherein the interference information comprises signal quality information relating a plurality of PRBs, including PRBs corresponding to the first and second frequency bands.

17. The system of claim 15, wherein determining the impact on the subscriber service further comprises:
assigning quantitative values to the subscriber service; and
creating a data set from signal quality information received from the base station and corresponding assigned quantitative values of the subscriber service.

18. The system of claim 15, wherein the subscriber service comprises at least one of: download throughput, upload throughput, voice over Long-Term Evolution ("VoLTE") quality, and call drop rate.

19. The system of claim 15, wherein predicting the improvement in the subscriber service based on reallocating the PUCCH from the first PRB to the second PRB further comprises:
analyzing signal quality information of a plurality of PRBs corresponding to a plurality of frequency bands not allocated to PUCCH, the plurality of frequency bands including the second frequency band; and
for each of the plurality of frequency bands, predicting an impact of the interference on the subscriber service if the respective frequency band was reallocated to PUCCH.

20. The system of claim 15, further comprising:
receiving additional interference information, wherein the additional interference information corresponds to a time period after the interference information; and
determining an impact of the additional interference on the subscriber service.

* * * * *